July 28, 1931.  R. H. POPE  1,816,695
GAUGE FOR MEASURING ENDLESS BELTS
Filed Dec. 27, 1929
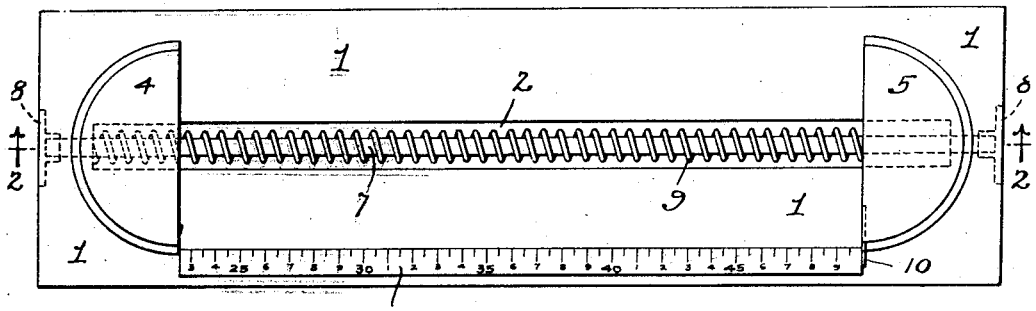
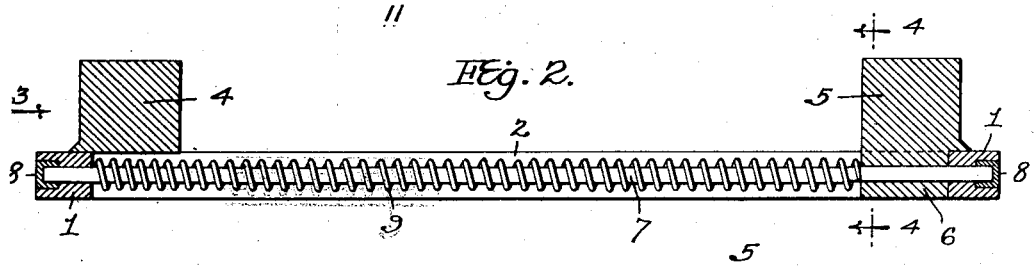
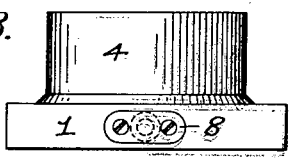
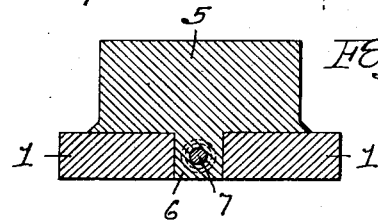
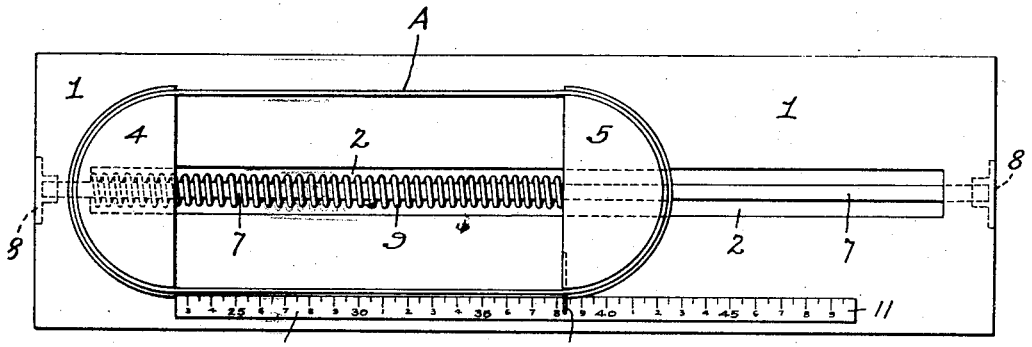
REYMOND HOLMES POPE
INVENTOR
WITNESS Patented July 28, 1931

1,816,695

UNITED STATES PATENT OFFICE

REYMOND HOLMES POPE, OF BATON ROUGE, LOUISIANA

GAUGE FOR MEASURING ENDLESS BELTS

Application filed December 27, 1929. Serial No. 416,909.

This invention relates to a device for measuring endless belts and the like, the general object of the invention being to provide two semi-circular members over which the belt is passed, one member being movably supported, with spring means for forcing this movable member away from the stationary member so that the spring will hold the belt stretched, with a pointer on the movable member operating over a scale to indicate the length of the belt.

This invention also consists in certain other features of construction and in the combination and arrangement of the several parts, to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which:—

Figure 1 is a plan view of the device.

Figure 2 is a section on line 2—2 of Figure 1.

Figure 3 is a view of one end of the device.

Figure 4 is a section on line 4—4 of Figure 2.

Figure 5 is a plan view showing the device in use.

In these views, the numeral 1 indicates a base which is provided with a centrally arranged longitudinally extending slot 2. A stationary semi-circular member 4 is attached to one end of the base and a similar member 5 is slidably arranged on the opposite end by having a reduced base part 6 fitting in the slot and having a hole therein through which a rod 7 passes, this rod passing through the slot and through the ends of the base and having its extremities fitting in the sockets in the socket members 8 countersunk in the ends of the base. A spring 9 is placed on the rod and engages the reduced part 6 of the member 5 and tends to hold said member at the end of the slot. A pointer 10 is attached to the flat edge of the member 5 and projects beyond the member and moves over a scale 11 on the base when the member 5 is moved.

From the foregoing and with reference to Figure 5, it will be seen that by moving the member 5 toward the member 4, a belt or other endless member A can be placed over the members 4 and 5 and the spring 9 will hold the belt stretched. Then the position of the marker on the scale will indicate the length of the belt.

It is thought from the foregoing description that the advantages and novel features of the invention will be readily apparent.

It is to be understood that changes may be made in the construction and in the combination and arrangement of the several parts, provided that such changes fall within the scope of the appended claim.

What I claim is:—

A device of the class described comprising a base having a longitudinal slot in its center, a rod passing through the slot and having its ends connected with the base, a movable semi-circular member having a reduced base part fitting in the slot, with a hole in the reduced part through which the rod passes, a spring on the rod for holding the movable member at one end of the slot, a stationary semi-circular member at the other end of the base, whereby an endless belt can be placed over the two members and the spring will hold it in stretched condition, a scale on the base and a marker on the movable member for indicating on the scale the length of the belt.

In testimony whereof I affix my signature.

REYMOND H. POPE.